United States Patent [19]

Malvano et al.

[11] 4,200,361
[45] Apr. 29, 1980

[54] LIQUID CRYSTAL MIRROR FOR USE AS A REAR-VIEW MIRROR FOR VEHICLES

[75] Inventors: Renato Malvano; Marco Omini; Natalino Carli, all of Turin, Italy

[73] Assignee: Fiat Societa per Azioni, Turin, Italy

[21] Appl. No.: 870,166

[22] Filed: Jan. 17, 1978

[30] Foreign Application Priority Data

Jan. 25, 1977 [IT] Italy .................. 67156 A/77

[51] Int. Cl.² ............................................. G02F 1/13
[52] U.S. Cl. ............................ 350/336; 350/278; 350/331
[58] Field of Search ............... 350/336, 331, 278, 334, 350/338

[56] References Cited
U.S. PATENT DOCUMENTS

| | | |
|---|---|---|
| 3,600,060 | 8/1971 | Churchill et al. ............. 350/336 X |
| 3,614,210 | 10/1971 | Caplan ........................ 350/311 X |
| 3,837,729 | 9/1974 | Harsch ........................ 350/336 X |
| 4,005,928 | 2/1977 | Kmetz et al. ................. 350/331 X |
| 4,023,890 | 5/1977 | Shirasu et al. ................ 350/336 |

Primary Examiner—Edward S. Bauer
Attorney, Agent, or Firm—Sughrue, Rothwell, Mion, Zinn and Macpeak

[57] ABSTRACT

A rear-view mirror for motor vehicles incorporates a liquid crystal film sandwiched between front and rear transparent electrode surfaces, the rear electrode surface being in the form of a lattice or net having a number of clear areas through which light passes unattenuated when the cell is activated to reduce the reflection of light by the mirror in response to the detection of headlight glare by a photocell mounted on the mirror.

1 Claim, 5 Drawing Figures

LIQUID CRYSTAL MIRROR FOR USE AS A REAR-VIEW MIRROR FOR VEHICLES

The present invention relates to rear-view mirrors for vehicles.

A familiar hazard for the driver of a vehicle, particularly a motor car, is that of being dazzled by the light beams from the headlights of a following vehicle, such beams being reflected by the rear-view mirror of the driver's vehicle.

In order to avoid this hazard rear-view mirrors are used which can be switched from a high to a low reflecting power, using for example a mirror with a front reflecting surface and a rear reflecting surface having respectively a low and a high reflectivity, these two surfaces being spaced apart and disposed one behind the other. By day the mirror is used in conditions of high reflecting power in order to afford the optimum rear visibility. At night, however, the mirror is used in conditions of low reflecting power to avoid driver dazzle due to the headlights of following vehicles.

Mirrors are also known which make use of the properties of nematic liquid crystals which are normally transparent to light but which when subjected to a sufficient electrical voltage, beyond a certain threshold of the order of 10–15 V, present a state of turbulence so that the light is attenuated to an increasing degree as the applied electric field is increased. Upon suppressing the applied electric field, the liquid crystal returns to the transparent state. Using such mirrors, therefore, it is possible to obtain selectively a high or a low reflecting power, according to whether the electrical voltage acting on the liquid crystal is lower or greater than said threshold.

The chief drawback of known liquid crystal mirrors is, however, that when the mirrors work in conditions of weak reflecting power the images of objects viewed by reflection in the mirror are considerably dimmed.

An object of the present invention is to provide a liquid crystal mirror, for use particularly as a rear-view mirror for vehicles, which, while avoiding the dazzling of the vehicle driver by the headlights of following vehicles, allows the driver sufficiently clear vision of the objects reflected in the mirror.

According to the present invention there is provided a liquid crystal mirror, for use as a rear-view mirror in a vehicle, of the type comprising a body supporting a number of optical elements including a transparent electrically insulating front plate the rear surface of which is covered with a thin transparent layer of electrically conductive material, a rear electrically insulating plate, spaced from the front plate and having a surface facing the rear surface of said front plate which is covered by a further layer of electrically conductive material, a cell defined between said plates and containing a film of liquid crystal in nematic form, said chamber being bounded laterally and fluid-tightly sealed by a band of insulating material interposed between said plates around the periphery of their facing surfaces, said layers of conductive material being connectible electrically to a voltage source to create an electric field in the film of liquid crystal, characterised in that the rear surface of the transparent front plate has a number of areas not covered by electrically conductive material, and arranged in a network bounded by straight lines which are substantially perpendicular to each other.

The invention will now be described, by way of example, with reference to the accompanying schematic drawings, in which.

Figure 1:
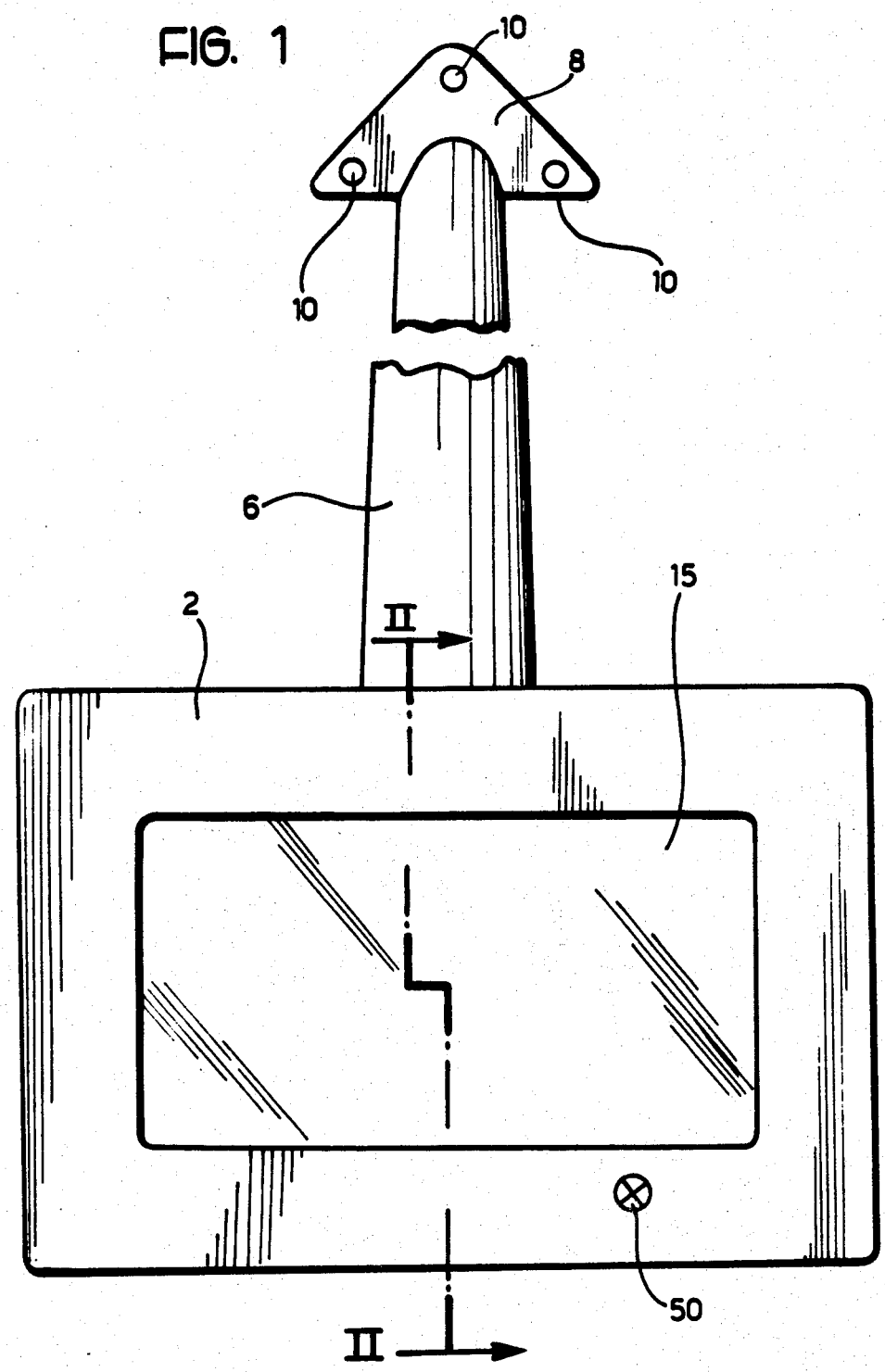
FIG. 1 is a front view of a liquid crystal mirror according to one embodiment of the invention.
Figure 2:
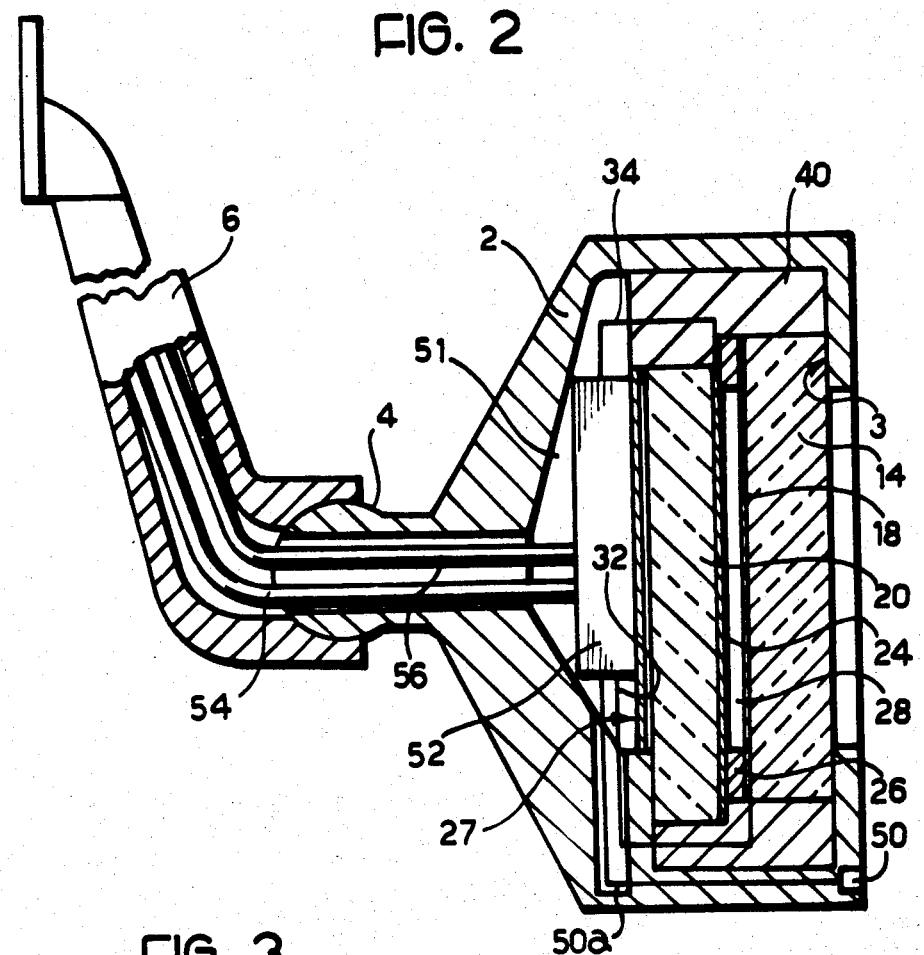
FIG. 2 is a transverse cross section of the mirror, taken on line II—II in FIG. 1.
Figure 3:
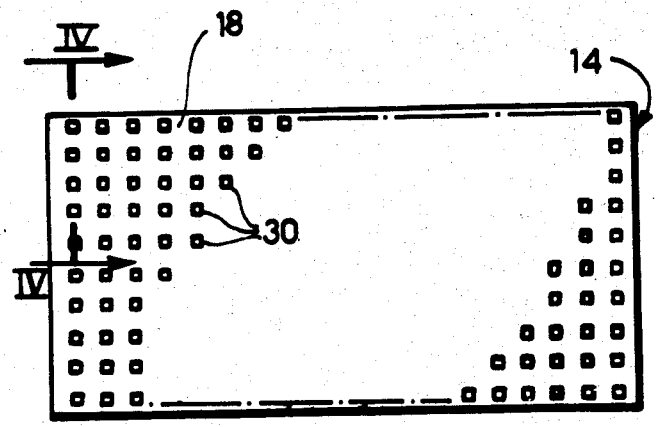
FIG. 3 is a plan view of the rear surface of the front plate of the optical system of the mirror.
Figure 4:
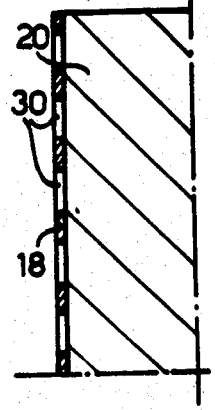
FIG. 4 is a cross section on an enlarged scale, taken on line IV—IV in FIG. 3, of part of the front plate.

With reference to FIGS. 1 to 4, the illustrated mirror according to the invention has a body 2 which encloses between a front and a rear part the optical elements of the mirror.

The body 2 is connected through a spherical joint 4 to one end of a supporting element in the form of an arm 6 which terminates at its other end in a plate 8 which has holes 10 for fixing the mirror to the body of the vehicle on which it is mounted.

The optical elements of the mirror are housed in a seat 3 in the body 2 and include a front plate 14 of transparent material such as glass or plastics material, the rear surface of which is covered by a layer 18 electrically conductive material which is so thin (of the order of 100–1000 Angstroms, according to the material of the conductive layer 18) as to be transparent.

The conductive layer 18 is discontinuous and in the form of a lattice so that the rear surface of the glass plate 14 has a number of uncovered small areas 30, substantially square in shape, with sides measuring 0.3–1 mm and a distance between their centres of about 1.5–3 mm. The small areas 30 are distributed in a lattice bounded by straight lines which are substantially perpendicular to each other.

Behind the front plate 14 there is a transparent rear plate 20 the front surface of which facing towards front plate 14, is covered by a continuous layer 24 of conductive material while its rear surface is metallised according to conventional mirror technology with a layer of metallic material so as to confer upon said rear surface good reflecting qualities, this reflective layer in turn being covered by a protective coating 27 as in normal mirrors.

The conductive layers 18 and 24 can be applied by any known technique, for example by deposition under vacuum. Suitable conductive materials for the layers 18 and 24 are chromium, tin oxide or indium oxide, or indium oxide doped with thin oxide or tin.

The facing plates 14 and 20 are staggered slightly in height (FIG. 2), and are kept spaced apart by a spacer strip 26 of insulating material which extends around the peripheral edge of the facing surfaces of the plates 14 and 20 and has such a thickness as to ensure a spacing between these surfaces between some hundredths to about a tenth of a millimeter, preferably between 1 and 3 huyndredths of a millimeter, so as to form a cell 28 delimited by the plates 14 and 20 and by the strip 26.

The cell 28 is filled with a film of a material which at least at the mean working temperature of use is in the form of nematic liquid crystal, such as, for example, N-(p-Methoxy benzylidene) -p-n-Butylaniline, produced by Kodak or the "Nematic mixture dynamic scattering II" (Eastman 11880) produced by the same firm.

The optical elements described above are covered on their peripheral surfaces by a layer 40 of cement material such as, for example, the product E-POX-E made by the firm Woodhill.

A photocell 50 is mounted in the front face of the body 2 of the mirror and is connected through a conductor 50a to an electrical circuit 52 housed in a space 51 within the mirror body 2 behind the optical elements. The circuit 52 is supplied from the electrical system of the vehicle through leads 54 and 56 which pass through holes in the arm 6 and in the body 2.

Two conductors 32 and 34 connect the outputs of the circuit 52 to the layer 18 and to the layer 24 respectively. The connections between the layers 18 and 24 and the conductors 32 and 34 are afforded by a conductive glue, such as, for example, the Silver Print varnish made by the firm O.C. Electronics (Rockford, Ill. U.S.A.), the connections being covered with an insulating varnish.

Figure 5:
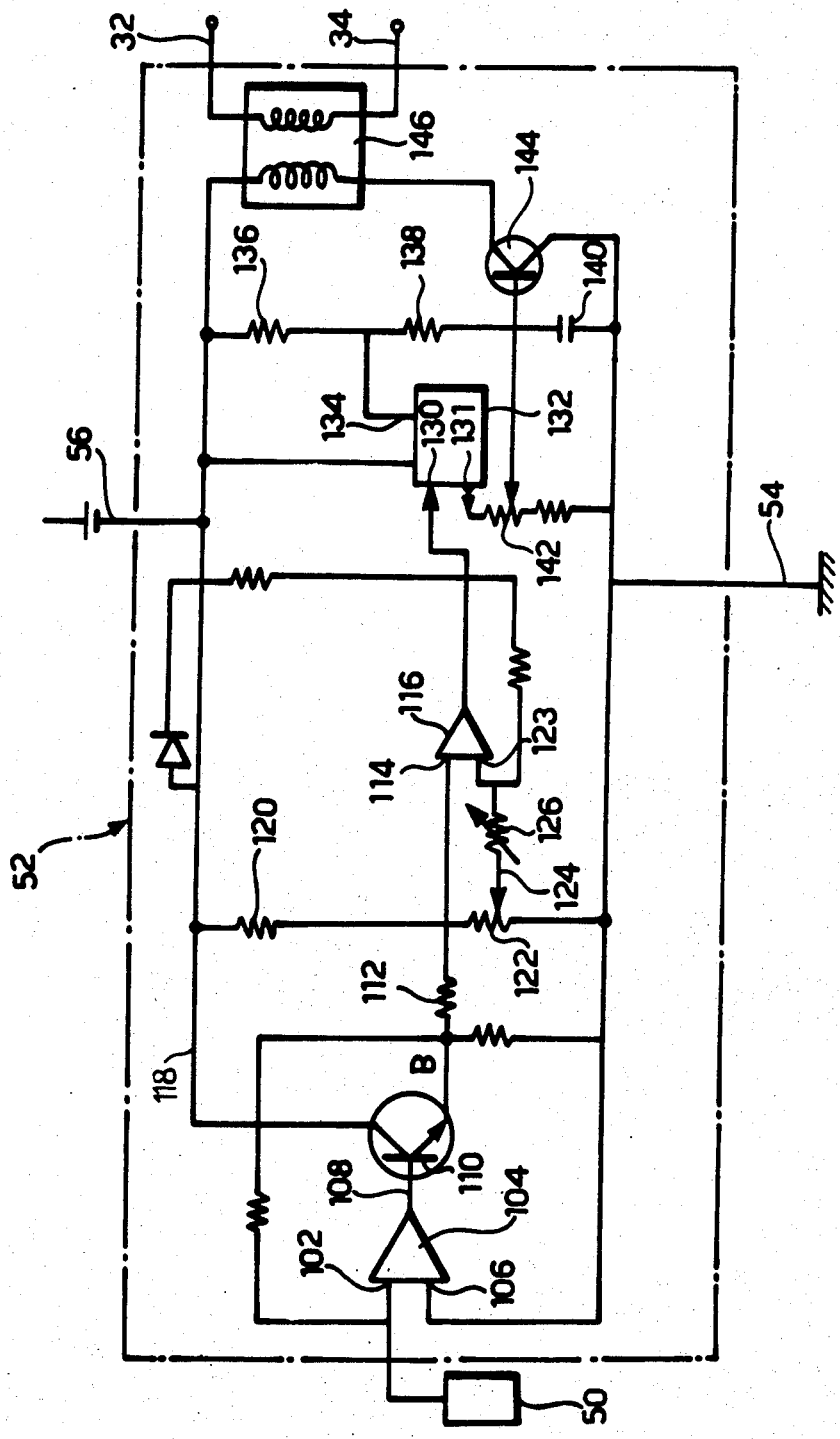
FIG. 5 is a circuit diagram of the electrical apparatus for controlling the voltage between the conductive layers of the mirror.

As illustrated in FIG. 5 the photocell 50 is connected to a first input 102 of a first amplifier 104 of the circuit 52, the amplifier 104 having a second input 106 connected to earth. The output 108 of the amplifier 104 is connected to the base of a transistor 110 the emitter of which is connected through a resistance 112 to a signal input 114 of a comparator 116, while the collector of the transistor 110 is connected to a supply line 118 to which the supply voltage is applied through the lead 56, the lead 54 being earthed.

A potential divider formed by a resistance 120 connected in series with a potentiometer resistance 122 is connected between the supply line 118 and earth. A reference input 123 of the comparator 116 is taken from this potential divider through a cursor 124 which slides along the resistance 122 and through a variable resistance 126. The output of the comparator 116 is connected to a first input 130 of an astable multivibrator 132 having a second input 134 between resistances 136 and 138 of a potential divider formed by the said resistances 136 and 138 in series with a capacitor 140. The astable multivibrator 132 is supplied from the supply line 118 while between the output 131 of the multivibrator and earth a potential divider 142 is connected, having a cursor connected to the base of a transistor 144. The transistor 144 acts as a second amplifier, its emitter being connected to earth and its collector being connected to one end of the primary of a transformer 146. The other end of the transformer primary is connected to the supply line 118, and the secondary of the transformer 146 is connected to the conductors 32 and 34 which feed the control voltage to the conductive layers 18 and 24.

In the operation of the circuit described above the current signal from the photocell 50 is passed to the input 102 of the first amplifier 104, in which the signal is converted into a voltage and amplified; the voltage at the point B will therefore be a function of the luminous intensity incident on the photocell 50.

The voltage signal at point B is applied through the resistance 112 to the input 114 of the comparator 116, while a threshold voltage is applied to the reference input 123 of the comparator, the response of which exhibits sufficient hysteresis to avoid continuous fluctuations in the output of the comparator when the intensity of the light incident on the photocell 50 exhibits small oscillations around a threshold intensity determined by the position of the cursor 124 on the potentiometer resistance 122. The amplitude of the hysteresis can be regulated by means of the variable resistance 126.

When the voltage at the input 114 of the comparator 116 exceeds the threshold voltage plus the hysteresis voltage divided by two the comparator switches over and enables the following stages; when the voltage at the input 114 falls and is lower than the threshold voltage less the hysteresis voltage divided by two the comparator switches over in the inverse direction.

The output of the comparator 116 is passed to the astable multivibrator 132 which acts as an oscillator the frequency of oscillation of which is determined by the magnitude of the resistances 136 and 138 and of the capacitor 140.

The alternating low output voltage from the astable multivibrator 132 is amplified by the transistor 144 and passed to the conductive layers 18 and 24 through the conductors 32 and 34. The control voltage output from the transformer 146 can be regulated by means of the variable resistance 126, which therefore acts as a means for calibrating the second amplifier 144.

The operation of the mirror according to the illustrated embodiment of the invention is as follows:

By day or in conditions which do not cause dazzling, the conductors 32 and 34 are isolated from the source of e.m.f. to which they are connected so that there is no electric field in liquid crystal film in the cell 28, which therefore presents the maximum transparency. Images of objects behind the vehicle in which the mirror is mounted are produced by reflection at the metallised rear surface of the rear plate 20 and appear to the driver of the vehicle at maximum luminous intensity.

When, on the other hand, the mirror is in use under conditions which would cause dazzling, as happens, for example, at night when the vehicle is followed by others which have their headlights on, the photocell 50, in resonse to incident light from the headlights of following vehicles of sufficient intensity to cause dazzle or annoyance, connects automatically, through the circuit 52, the conductors 32 and 34 to the voltae source, so that the liquid crystal film is subjected to an electrical voltage greater than a minimum threshold value, as a result of which the film attenuates the incident and reflected light to a certain extent. This attenuation does not take place over the whole surface of the mirror, however, since the applied electric field exists only between the layer 24 and those parts of the rear surface of the front plate 14 covered by the layer 18 of conductive material: in these parts the light is effectively attenuated, while in correspondence with the exposed areas 30 of the surface of the plate 14, not covered by conductive material, the electric field does not act and therefore the light is not attenuated.

Images of objects at the rear of the vehicle under dazzling conditions are therefore seen by the driver as though through a net made up of more or less luminous cells. This arrangement has the advantage that a noticeable diminution of dazzling results which is not, however, accompanied by an excessive loss of clarity of the images reflected.

The square shape of the exposed areas 30 has proved to be particularly effective compared with other shapes to achieve optimum diminution of dazzling reflection compatible with a clear visibility of the images reflected.

What is claimed is:

1. A liquid crystal rear-view mirror, for use in a vehicle, of the type comprising:

a body adapted to be attached to the vehicle, a number of optical elements supported by said body and including a transparent electrically insulating front plate, a thin transparent first layer of electrically conductive material covering the rear surface of the front plate, a rear electrically insulating plate spaced from said front plate and having a front surface facing the said rear surface of said front plate and a rear surface opposite to its front surface, a second thin transparent layer of electrically conductive material covering said front surface of the rear plate, a reflecting layer on said rear surface of the rear plate, a band of insulating material interposed and fluid-tightly sealed between said front and rear plates around the peripheries of said rear and front surfaces to define a cell between said plates, a film of liquid crystal in nematic form contained within said cell, and means for connecting said conductive layers electrically to a voltage source to create an electric field in the liquid crystal film, wherein the improvement consists in said first layer of electrically conductive material having a lattice form bounded by straight mutually perpendicular lines which define a number of exposed areas of said rear surface of said front plate free of electrically conductive material, said exposed areas being square in shape and having a side substantially 0.3–1 mm long, the centres of said areas being separated from each other by 1.5–3 mm.

* * * * *